(12) United States Patent
Shiratori et al.

(10) Patent No.: US 7,016,136 B2
(45) Date of Patent: Mar. 21, 2006

(54) METHOD AND SYSTEM FOR ADJUSTING A MAGNETIC TAPE HEAD

(75) Inventors: Toshiyuki Shiratori, Tokyo (JP); Toshimi Ataku, Kanagawa-ken (JP); Tomoaki Kimura, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 191 days.

(21) Appl. No.: 10/369,253

(22) Filed: Feb. 18, 2003

(65) Prior Publication Data

US 2003/0169529 A1 Sep. 11, 2003

(51) Int. Cl.
G11B 15/18 (2006.01)

(52) U.S. Cl. .................................................. 360/69
(58) Field of Classification Search .............. 360/69, 360/128, 137, 30.63; 369/30.63; 242/346; 386/87; 709/247
See application file for complete search history.

(56) References Cited

U.S. PATENT DOCUMENTS

| | | | | |
|---|---|---|---|---|
| 3,761,994 A | * | 10/1973 | Becht | 15/210.1 |
| 3,881,195 A | * | 4/1975 | Ono et al. | 360/128 |
| 4,158,871 A | * | 6/1979 | Leaming | 360/137 |
| 4,893,209 A | * | 1/1990 | Siddiq | 360/128 |
| 4,928,189 A | * | 5/1990 | Siddiq | 360/128 |
| 5,294,072 A | * | 3/1994 | East et al. | 242/346 |
| 5,297,754 A | * | 3/1994 | Albrecht et al. | 242/343 |
| 5,297,755 A | * | 3/1994 | Felde et al. | 242/346 |
| 5,316,235 A | * | 5/1994 | East et al. | 242/346 |
| 5,484,055 A | * | 1/1996 | Felde et al. | 206/387.1 |
| 5,581,073 A | * | 12/1996 | Felde et al. | 235/489 |
| 5,665,294 A | * | 9/1997 | Wittes | 264/160 |
| 5,684,766 A | * | 11/1997 | Inoue et al. | 369/30.63 |
| 5,768,535 A | * | 6/1998 | Chaddha et al. | 709/247 |
| 6,021,026 A | * | 2/2000 | Dallago | 360/128 |
| 6,067,212 A | * | 5/2000 | Poorman | 360/128 |
| 6,128,433 A | * | 10/2000 | Gable et al. | 386/87 |
| 6,154,341 A | * | 11/2000 | Dallago | 360/128 |
| 6,166,881 A | * | 12/2000 | Anderson et al. | 360/128 |
| 6,215,618 B1 | * | 4/2001 | Anderson et al. | 360/128 |
| 6,266,817 B1 | * | 7/2001 | Chaddha | 725/146 |
| 6,523,749 B1 | * | 2/2003 | Reasoner et al. | 235/462.25 |

(Continued)

OTHER PUBLICATIONS

Japanese Utility Model(Laid Open), A magnetic tape player, PUUMA, Heisei4–20607, Feb. 20, 1992.
Bloomquist, Darrel R., Tape Drive Cleaning Cartrige Equipped With Data Tape Reader, PUPA, 11–296826, Oct. 29, 1999.
Kato Masaaki, Rotary Head Magnetic Recording/Reproducing Device, PUPA, 09–054906, Feb. 25, 1997.
Tsuji Masaki, Magnetic Recording and Reproducing Device, PUPA, 05–342510, Dec. 24, 1993.
Horikoshi Takayuki, Cleaning Tape and Recording and Reproducing Device, PUPA, 06–309632, Apr. 11, 1994.
Morita Kiyoo, Tape Reel, PUPA, 2001–222875, Aug. 17, 2001.

(Continued)

*Primary Examiner*—David Hudspeth
*Assistant Examiner*—Fred F. Tzeng
(74) *Attorney, Agent, or Firm*—Dale M. Crockatt; John C. Kennel; Dillon & Yudell LLP

(57) ABSTRACT

A method of adjusting a magnetic head of the invention includes the steps of: setting a cleaning cartridge into a drive unit; identifying the set cartridge as the cleaning cartridge by checking a cleaning bit in a non-volatile memory; performing an adjustment-operation after a cleaning operation when the set cartridge is identified as the cleaning cartridge; and reading out a pattern signal from a predetermined segment of the magnetic tape held in the cleaning cartridge.

15 Claims, 11 Drawing Sheets

U.S. PATENT DOCUMENTS

| | | | | |
|---|---|---|---|---|
| 6,567,363 B1 | * | 5/2003 | Juman et al. | 720/631 |
| 6,577,562 B1 | * | 6/2003 | Gallo et al. | 369/30.63 |
| 6,614,751 B1 | * | 9/2003 | Katao | 720/736 |
| 6,615,435 B1 | * | 9/2003 | Randall | 15/104.002 |
| 6,672,527 B1 | * | 1/2004 | Tsuyuki et al. | 242/344 |
| 6,694,106 B1 | * | 2/2004 | Yoshimura | 399/12 |
| 6,757,123 B1 | * | 6/2004 | Masuda et al. | 360/69 |

OTHER PUBLICATIONS

Suga Atsuo, Higuchi Shigemitsu, Fujita Koji, Aizawa Toshiro and Kosuge Minoru, Magnetic Tape Device, PUPA, May 19, 1995.

Miyano Tetsuo and Yokota Hiroshi, Magnetic Recording and Reproducing Device, PUPA, Jan. 14, 2000.

Ishii Masami, Rotary Magnetic Head Type Magnetic Recording and Reproducing Device, PUPA, 10-143832, May 29, 1998.

Wada Masayuki, Head Monitoring Apparatus and Head Monitoring Method, PUPA, 10-312518, Nov. 24, 1998.

Takayama Yoshihisa and Steve Baker, Cleaning Cassette and Tape Drive Device, PUPA, 2002-063705, Feb. 28, 2002.

Tanaka Hideya, Cleaning Cassette and Recording and Reproducing Device, PUPA, 09-251623, Sep. 22, 1997.

* cited by examiner

_US 7,016,136 B2_

METHOD AND SYSTEM FOR ADJUSTING A MAGNETIC TAPE HEAD

FIELD OF THE INVENTION

The present invention relates to magnetic recording, and more particularly to a cleaning cartridge, a drive unit, a method of adjusting a magnetic head, and a magnetic recording system, each utilizing novel magnetic tape-running control under which on-site adjustments can be made to the magnetic head when the user directs a cleaning operation, and wherein further, a failure of the magnetic head can be detected and predicted through the cleaning operation performed at the user's end.

DESCRIPTION OF THE PRIOR ART

Magnetic recording media have been used in various types of computer systems, and are used extensively because of the ability to achieve high-speed and high capacity recording. Magnetic tapes, among others, are the magnetic recording media that have been put in practical use since the early stage, and the use of magnetic tapes has been increasing because of the high reliability and the ability to achieve high-capacity recording at a high cost/performance ratio.

Generally, recording onto magnetic tape is performed through the use of a magnetic head placed adjacently to the magnetic tape, and the magnetization recorded in the magnetic tape is read out by a read head. The read information is processed in certain peripheral circuits and sent to various devices including a central processing unit (CPU). The information recorded in the magnetic tape can be thus utilized in a computer system or the like. In the magnetic recording method described above, the magnetic head is placed in close proximity to the magnetic tape to increase the recording density to meet the demands for the high-density and high-speed recording in recent years. For this reason, it is known that the magnetic head undergoes tribological deterioration with time, such as wear and contamination, by friction with the magnetic tape running at a high speed in close proximity to the magnetic head. On the other hand, magnetic parameters in the peripheral circuits of the magnetic head are adjusted during fabrication and maintained in a non-volatile memory in the drive unit to be used when processing signals from the magnetic head and the peripheral circuits. Hence, read/write characteristics of the magnetic tape can vary as a result of deterioration over time in the characteristics of the magnetic head, which poses an inconvenience in that playback of recorded information becomes less accurate with time.

This inconvenience may be eliminated by two countermeasures. One of the countermeasures is addressed with respect to contaminants on the magnetic head. In a cleaning operation, it is known to remove contaminants on the magnetic head by cleaning the magnetic head through the use of a special magnetic tape called a cleaning tape, manufactured to specifications different from normal specifications.

FIG. 14 is a top view of a cleaning tape used in conventional cleaning method. The cleaning cartridge generally accommodates a cleaning tape having no recorded signal, such as a servo signal. According to the cleaning method using the conventional cleaning tape shown in FIG. 14, the cleaning tape is forwarded around a non-usable segment first, then the cleaning tape (magnetic tape) is run back and forth along a segment DC1 of a predetermined length. The magnetic head adjacent to the cleaning tape is thereby cleaned. Because the used segment DC1 is contaminated through this cleaning manipulation, a segment DC2 adjacent to the segment DC1 in the direction toward the front end of the cleaning tape is used when a cleaning operation is performed next time.

The other countermeasure is directed to adjustments in response to deterioration in characteristics of the magnetic head. However, to date, the user has no effective means for making an on-site check, adjustment, or prediction as to a deterioration in the characteristics of the magnetic head, and simply repeats read/write operations using the parameters set in the fabrication stage until a trouble occurs in operation of the drive unit. In ordinary circumstances, the magnetic head of the drive unit and the parameters in the peripheral circuits are re-adjusted occasionally, for example, at the time when maintenance is performed on the computer system to which the magnetic recording system is connected, or when a countermeasure is taken in the event of failure; moreover, the degree of deterioration with time of the magnetic head remains uncertain. Thus, although the characteristics of the magnetic head have changed or deteriorated, the user continues to read/write information unless a significant inconvenience occurs in the magnetic recording system. Also, on the part of the service engineer, much time and labor are wasted in replacing an operable magnetic head or in making adjustments to the peripheral circuits.

Further, it is often the case that the user encounters an on-the-job trouble unexpectedly and finds himself making an urgent request to the manufacturer for on-site maintenance, such as, for example, replacement of the magnetic head, or sending the drive unit back to the manufacture to have the magnetic head and the peripheral circuits adjusted as needed only after the magnetic head has deteriorated to the extent that it can no longer perform read/write operations in a satisfactory manner. Thus, it is important also for the user to understand the exact deteriorated conditions of the magnetic head with time in terms of saving computation time and labor. As has been described above, eliminating an inconvenience caused in performing maintenance in response to deterioration with time in characteristics of the magnetic head is tedious and time-consuming for both the user and the manufacturer.

SUMMARY OF THE INVENTION

The present invention was devised to solve the above noted problems, and the invention provides a cleaning cartridge, a drive unit, a method of adjusting a magnetic head, and a magnetic recording system, each capable of adjusting the peripheral circuits when cleaning is performed to allow the magnetic head to perform read/write operations appropriately in response to deterioration in characteristics of the magnetic head by monitoring a change in characteristics of the magnetic head.

The present invention was also devised with the idea that if on-site adjustments can be made to the peripheral circuits on the user's end in response to deterioration in characteristics of the magnetic head when a cleaning operation is performed through writing and reading of a specific magnetic signal while part of the cleaning operation is performed, the conventional inconvenience described above can be eliminated and the magnetic recording system can be used more extensively.

The present invention also uses a cleaning cartridge holding a magnetic tape provided with segments arranged in the same manner as a normal cleaning tape except that a magnetically readable pattern signal is recorded in part thereof. In one embodiment of the invention, the pattern signal can be formed in close proximity to the front end of the magnetic tape. According to the present invention, when the drive unit confirms that cleaning of the magnetic head is to be performed, the drive unit performs cleaning of the magnetic head using a predetermined segment of the cleaning tape (magnetic tape). When the cleaning ends, the cleaning tape is run in the direction of the pattern-signal-recorded segment, that is, toward the front end, then a specific pattern to be used as a test signal is written into and read out from the adjacent segment, in association with which the parameters in the peripheral circuits are adjusted.

When the adjustment ends, the cleaning tape is run again to read out the pattern signal recorded in close proximity to the front end through the use of the adjusted parameters. The peak value of the read signal, together with the recorded peak values obtained by the adjustments in the past, is used to check deterioration of the magnetic head and to predict the occurrence of a failure in the near future. The peak value read out after the adjustment is recorded together with time information, such as date information and drive operating time. A threshold value corresponding to a deteriorated condition that needs, for example, repairing by the manufacturer is set for the peak value of the signal generated through the use of the pattern signal. The magnetic recording system of the present invention determines a period needed to reach the threshold value through any applicable extrapolation method using the peak values recorded together with the time information. The magnetic recording system of the present invention is thus able to notify the user of a magnetic head-induced failure.

Specifically, the present invention provides a cleaning cartridge, including: a casing; means for identifying itself as the cleaning cartridge; and a magnetic tape provided with a cleaning and adjustment portion extending from a front end to a rear end and including a recorded magnetically readable pattern signal. In the cleaning cartridge of the present invention, the means for identifying itself as the cleaning cartridge is a nonvolatile memory installed in the casing. In the present invention, it is preferable that the cleaning cartridge is in conformity with linear tape open (LTO) standards.

The present invention provides a drive unit for performing writing and reading with respect to a magnetic tape, including: means for identifying a set cartridge as a cleaning cartridge; and means for causing the drive unit to perform an adjustment-operation for the magnetic head when the set cartridge is identified as the cleaning cartridge.

It is also preferable that the drive unit further includes: means for causing the drive unit to perform a cleaning operation prior to the adjustment-operation for the magnetic head; and means for reading out a pattern signal from a predetermined segment of the magnetic tape held in the cleaning cartridge, and that the identifying means of the present invention preferably includes means for checking a certain bit in a non-volatile memory installed in the cleaning cartridge. It is preferable that the adjustment-operation causing means of the invention causes the drive unit to perform the cleaning operation through the use of a predetermined segment of the magnetic tape first, and thereafter causes the drive unit to perform the adjustment-operation through the use of a segment adjacent to the predetermined segment of the magnetic tape. In the present invention, it is preferable that the adjustment-operation causing means writes a specific pattern in the adjacent segment and reads out the written specific pattern using the magnetic head, and changes a parameter in a peripheral circuit of the magnetic head in association with reading of the specific pattern.

In the present invention, it is preferable that the drive unit further includes means for recording the read pattern signal together with time information. In the present invention, it is preferable that the drive unit further includes means for giving a notice about deterioration of the magnetic head revealed by the adjustment-operation.

The present invention provides a method of adjusting a magnetic head for making adjustments to the magnetic head that performs reading and writing with respect to a magnetic tape. The adjusting method includes the steps of: setting a cleaning cartridge into a drive unit; identifying the set cartridge as the cleaning cartridge; and performing an adjustment-operation for the magnetic head when the set cartridge is identified as the cleaning cartridge.

It is also preferable that the adjusting method further includes the steps of: performing a cleaning operation prior to the adjustment-operation for the magnetic head; and reading out a pattern signal from a predetermined segment of the magnetic tape held in the cleaning cartridge, and that the identifying step of the invention includes a step of checking a certain bit in a non-volatile memory installed in the cleaning cartridge. In the present invention, the adjustment-operation performing step may include a step of performing the cleaning operation through the use of a predetermined segment of the magnetic tape first, and thereafter performing the adjustment-operation through the use of a segment adjacent to the predetermined segment of the magnetic tape. The adjustment-operation of the present invention may include the steps of: writing a specific pattern in the adjacent segment; reading out the written specific pattern; and changing a parameter in a peripheral circuit of the magnetic head in association with reading of the specific pattern. In the present invention, a step of recording the read pattern signal together with time information may be included, too. In the present invention, a step of giving a notice about deterioration of the magnetic head revealed by the adjustment-operation may be included, also.

The present invention provides a magnetic recording system, comprising: a cleaning cartridge including means for identifying itself as the cleaning cartridge, and a magnetic tape including a cleaning and adjustment portion extending from a front end to a rear end and which has recorded a magnetically readable pattern signal, which are put in a casing; and a drive unit that need a cleaning operation for a magnetic head for writing and reading out information into and from the magnetic tape, uses the cleaning cartridge to perform cleaning of the magnetic head, and makes adjustments to the magnetic head, wherein the drive unit comprises: means for identifying a set cartridge as the cleaning cartridge; means for causing the drive unit to perform an adjustment-operation for the magnetic head when the set cartridge is identified as the cleaning cartridge; means for reading out a pattern signal from a predetermined segment of the magnetic tape held in the cleaning cartridge; and means for recording the read pattern signal together with time information. The cleaning cartridge is in conformity with LTO standards. The drive unit of the invention may further include: means for performing a cleaning operation prior to the adjustment-operation for the magnetic head; means for reading out a pattern signal from a predetermined segment of the magnetic tape held in the cleaning cartridge; and means for giving a notice about deterioration of the magnetic head revealed by the adjustment-operation.

DETAILED DESCRIPTION OF THE PREFERRED EMBODIMENTS

Figure 1:
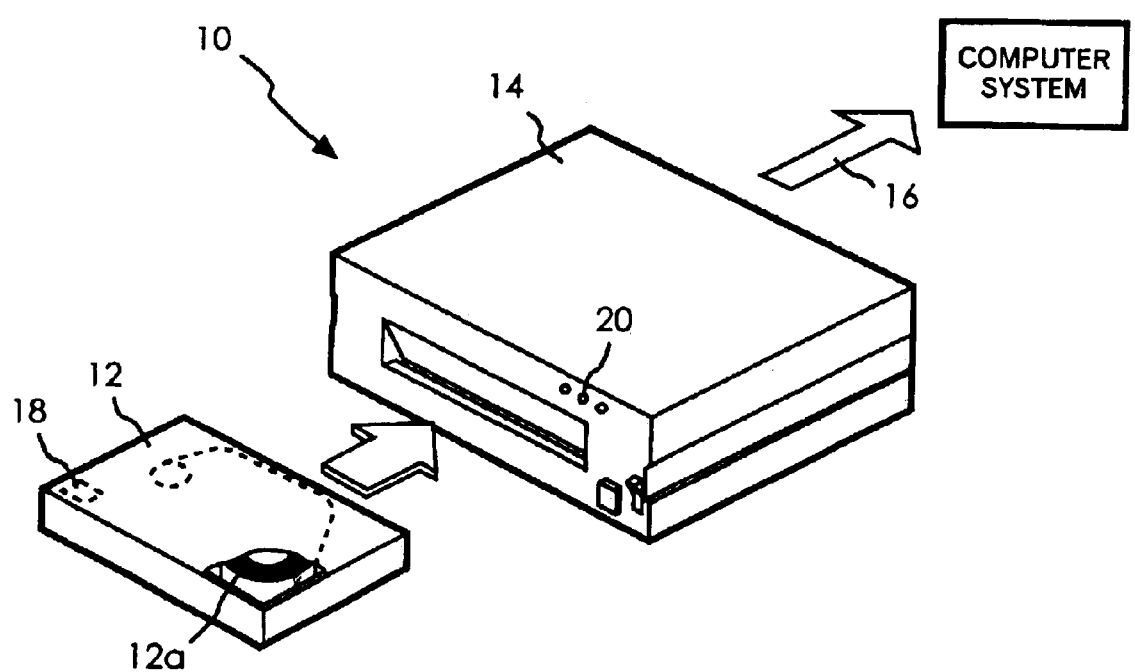
FIG. 1 is a schematic perspective view of a magnetic recording system of the invention.

The following description will describe in detail the present invention by way of embodiments each illustrated in the accompanying drawings. It should be appreciated, however, that the invention is not limited to the embodiments illustrated in the accompanying drawings. FIG. 1 is a schematic perspective view of a magnetic recording system of the invention. A magnetic recording system 10 shown in FIG. 1 is composed of a magnetic tape cartridge 12 and a drive unit 14 into/from which the magnetic tape cartridge 12 is loaded/unloaded. Inside the magnetic tape cartridge 12 is a spool of long magnetic tape 12a cut to a width in conformity with linear tape open (LTO) standards in this particular embodiment of the invention. It is arranged in such manner that the magnetic tape 12a is run by a driving section (not shown) provided inside the drive unit 14. It should be appreciated, however, that a magnetic tape with a width of, for example, approximately 12.5 mm, 9.5 mm, or 6 mm, in conformity with suitable standards other than LTO standards can be used in another embodiment of the invention. It is needless to say that the drive unit 14 is also provided with a magnetic head (not shown) for reading out information recorded in the magnetic tape 12a.

The drive unit 14 shown in FIG. 1 controls the gain of read analog information, then converts the analog information into digital data, and processes the digital data using control elements, such as a channel controller and a central processing unit (CPU). The recorded magnetic record information can be thus transferred to a computer system via a bus line 16. Peripheral circuits including the aforementioned control elements will be described more in detail below.

As shown in FIG. 1, in this invention, a non-volatile memory 18 is installed inside the magnetic tape cartridge 12 at a suitable portion, and this arrangement allows the magnetic tape cartridge 12 to identify itself as a cleaning cartridge when loaded into the drive unit 14. In FIG. 1, the non-volatile memory 18 is indicated by a broken line. A cleaning bit identifying itself as the cleaning cartridge is set in the non-volatile memory 18. The drive unit 14 checks the cleaning bit in the non-volatile memory 18 using a suitable bus line or the like, and judges whether the set cartridge is for the use of cleaning.

In this particular embodiment of the invention, the magnetic tape cartridge 12 and the drive unit 14 can be of elements in conformity with any known standards. However, in the invention, it is preferable to use a magnetic recording system in conformity with linear tape open (LTO) standards in terms of a tape running speed and a memory capacity.

Further, in the magnetic recording system 10 shown in FIG. 1, the drive unit 14 is provided with, on its front panel, an indicator 20 composed of an LED or an LCD for notifying the user or the service engineer of the deteriorated conditions of the magnetic head in accordance with the invention. The indicator 20 may be arranged so that it can change its color depending on the degree of notification to the user in association with the deteriorated conditions of the magnetic head, for example, by illuminating in red, yellow, and green when notifying the occurrence of an abnormality, a warning about the occurrence of a failure in the near future, and the normal condition, respectively. In the invention, besides the indicator 20 provided to the drive unit 14, a notice can be given to the user by any other means as long as the user is notified of the conditions, for example, by arranging the magnetic recording system 10 to give a warning to the user at the initial system diagnosis for the connected computer system.

Figure 2:
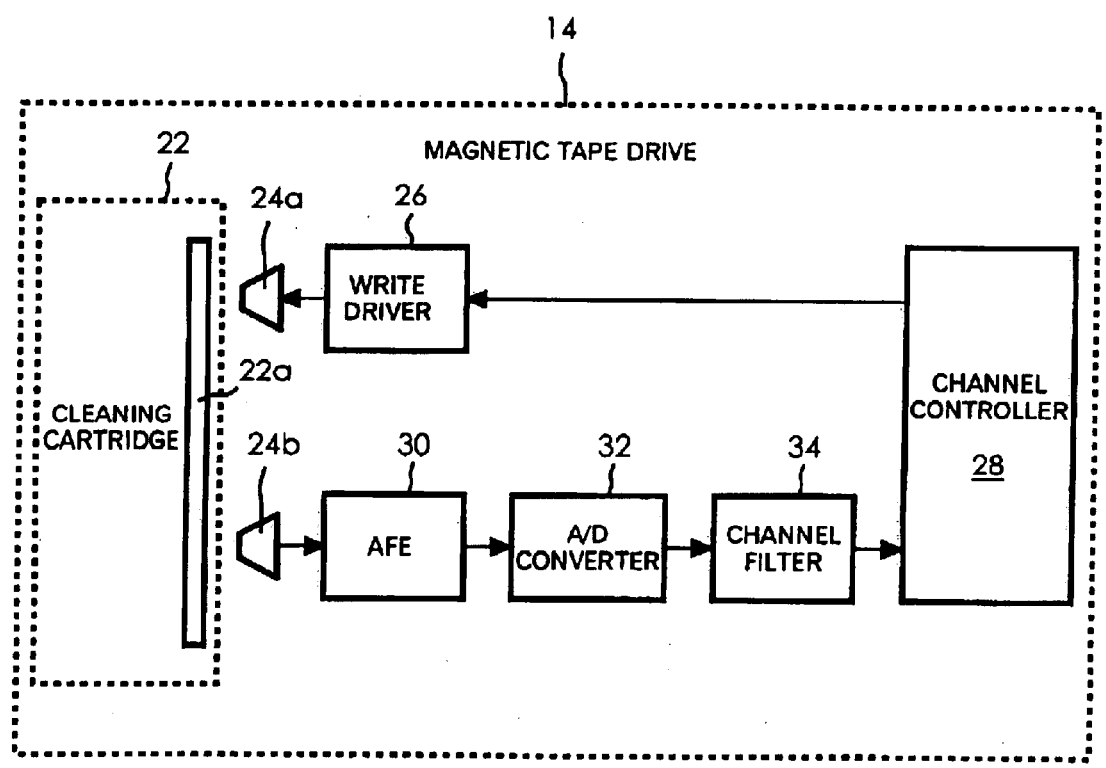
FIG. 2 is a schematic block diagram of the magnetic recording system of the invention.

FIG. 2 is schematic block diagram showing an arrangement of the interior of a cleaning cartridge 22 and the drive unit 14 of the invention shown in FIG. 1. According to the embodiment shown in FIG. 2, the cleaning cartridge 22 is loaded into the drive unit 14. As shown in FIG. 2, a cleaning tape 22a of the cleaning cartridge 22 loaded in the drive unit 14 is placed in close proximity to a magnetic head 24a used for writing and a magnetic head 24b used for reading to increase the recording density. Also, it is arranged in such a manner that the magnetic head 24a is connected to a write driver 26, and the write driver 26 is supplied with information to be written from a channel controller 28. When the magnetic head 24a shown in FIG. 2 receives a signal from the channel controller 28 through the write driver 26 at a command from a CPU (not shown), it generates a magnetic field using an electromagnet. The supplied information can be thus written into the magnetic tape 22a.

The magnetic head 24b used for reading transfers read analog information to a driver (analog front end, hereinafter abbreviated to AFE) 30 used for reading. The AFE 30 is provided with an automatic gain controller, and is thereby able to adjust the gain automatically. The AFE 30 used in the invention transfers a read analog signal further to an analog-to-digital converter (A/D converter) 32. A digital output from the A/D converter 32 is inputted into a channel filter 34, and after noises are eliminated therein, the digital output is inputted into the channel controller 28 to be transferred further to the central processing unit (not shown). The read analog signal can be thus utilized in the computer system or the like.

Figure 3:
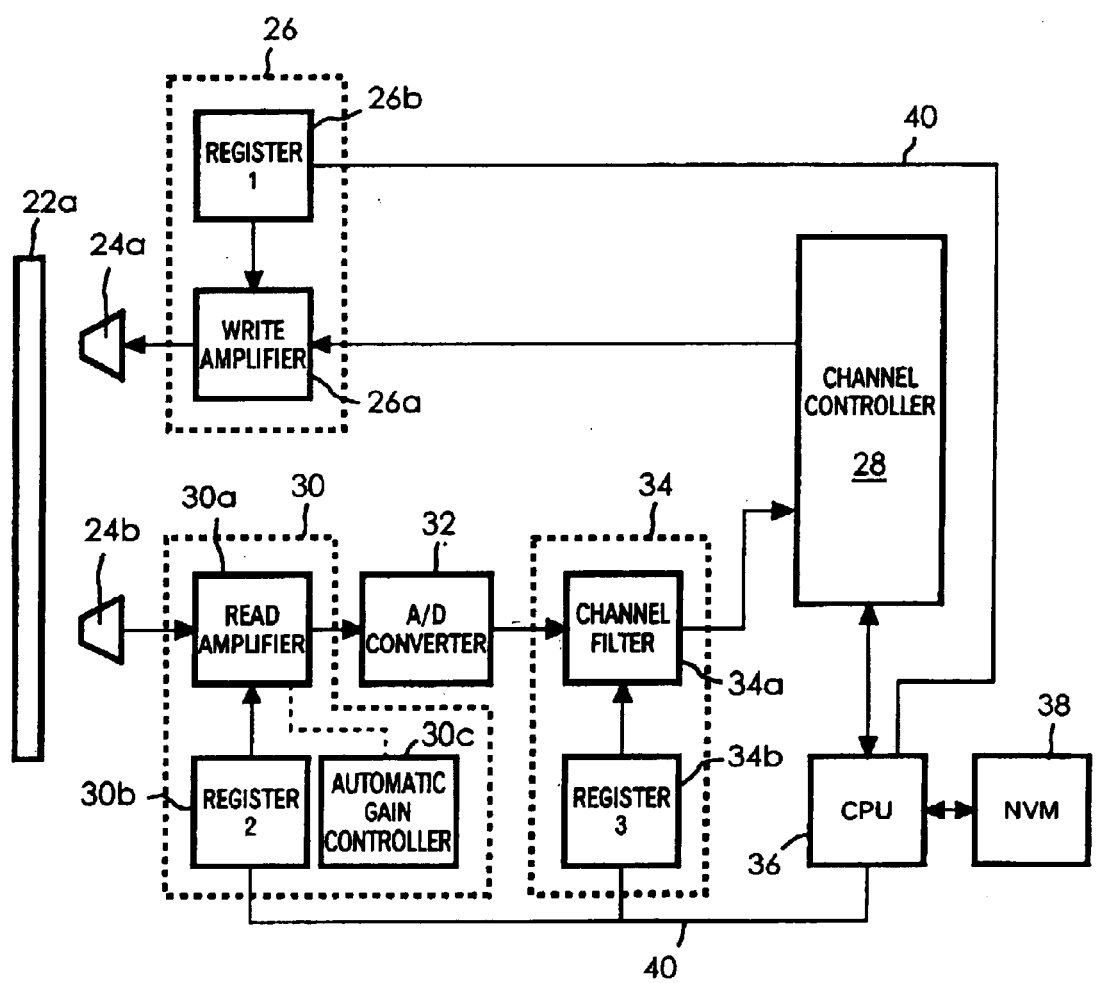
FIG. 3 is a detailed block diagram of the magnetic recording system of the invention.

FIG. 3 is a block diagram depicting an arrangement of one embodiment of the magnetic recording system of the invention shown in FIG. 2. As shown in FIG. 3, the write driver 26 is composed of a write amplifier 26a and a register 26b. Also, the AFE 30 is composed of a read amplifier 30a, a register 30b, and an automatic gain controller 30c. Also, as shown in FIG. 2, an output from the AFE 30 is inputted into the AID converter 32 and converted into a digital form. The channel filter 34 then applies suitable signal processing (to be more specific, noise elimination, signal enhancement, etc.) to the digital output, and inputs the processed digital output to the channel controller 28. To be more specific about the channel filter 34, it is composed of a channel filter 34a and a register 34b for maintaining a parameter used for filtering, and is arranged to be able to change the filter characteristics by varying the parameter.

The channel controller 28 communicates with a CPU 36, in which the read signal is maintained temporarily and processed further, and from which the resulting signal is transferred to an external device (not shown). The CPU 36 is connected to a non-volatile memory 38, and the CPU 36 and the non-volatile memory 38 are thereby able to communicate with each other. In the invention, the non-volatile memory 38 can maintain data of various kinds. For example, bedsides programs including a tape-running driving control program and various programs to be run in performing cleaning of the invention, the non-volatile memory 38 records adjusting parameters used for adjustments, such as a write parameter, a read parameter, and a filter parameter, which are used in the invention when adjustments are made through the use of the cleaning tape and transferred respectively to the register 26b, the register 30b, and the register 34b via a bus line 40 as needed.

In the invention, the adjusting parameters for the magnetic head are maintained in advance in information maintaining means, such as the non-volatile memory 38. The adjustments to the magnetic head and the check of deterioration are thus made possible in succession when the cleaning operation is performed. The following description will describe in detail a process of the magnetic head adjusting method of the invention for making adjustments to the magnetic head when cleaning is performed.

Figure 4:
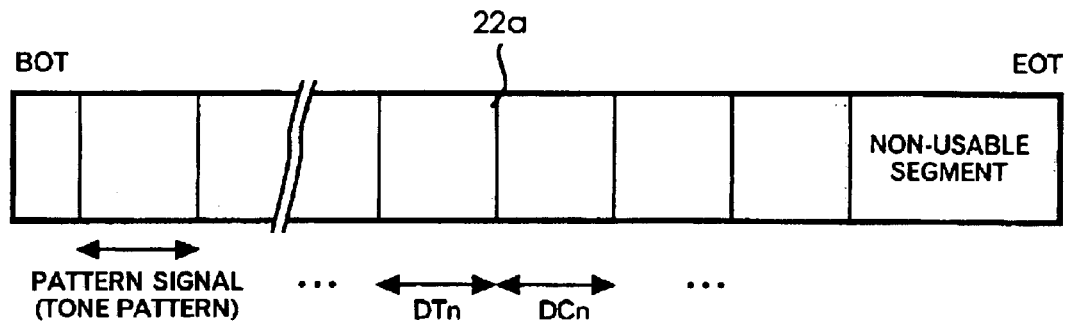
FIG. 4 is a schematic top view of a cleaning tape of the invention.

The cleaning cartridge used in the invention accommodates a normally wound-up cleaning tape in the interior. FIG. 4 is a view of a cleaning tape 22a pulled out from the cleaning cartridge to show an arrangement of the segments used for cleaning and adjustment. The cleaning tape 22a used in the invention has a front end BOT, a rear end EOT, and a cleaning and adjustment portion extending from the front end BOT to the rear end EOT. For example, a sinusoidal pattern signal known as a tone pattern is formed in close proximity to one end at the front end BOT of the cleaning tape 22a. In this particular embodiment shown in FIG. 4, the pattern signal is formed adjacently to the front end BOT as the most preferred embodiment. It should be appreciated, however, that, in the invention, the pattern signal can be formed anywhere unless it causes a trouble in the cleaning operation and the adjustment-operation. Also, the cleaning and adjustment portion is arranged in such a manner that segments DCn used for cleaning and segments DTn used for adjustment are secured alternately toward the rear end EOT of the cleaning tape 22a. Further, in the case of the cleaning tape 22a shown in FIG. 4, a non-usable segment not for use in the normal state is formed adjacently to the rear end EOT of the cleaning tape 22a.

Figure 5:
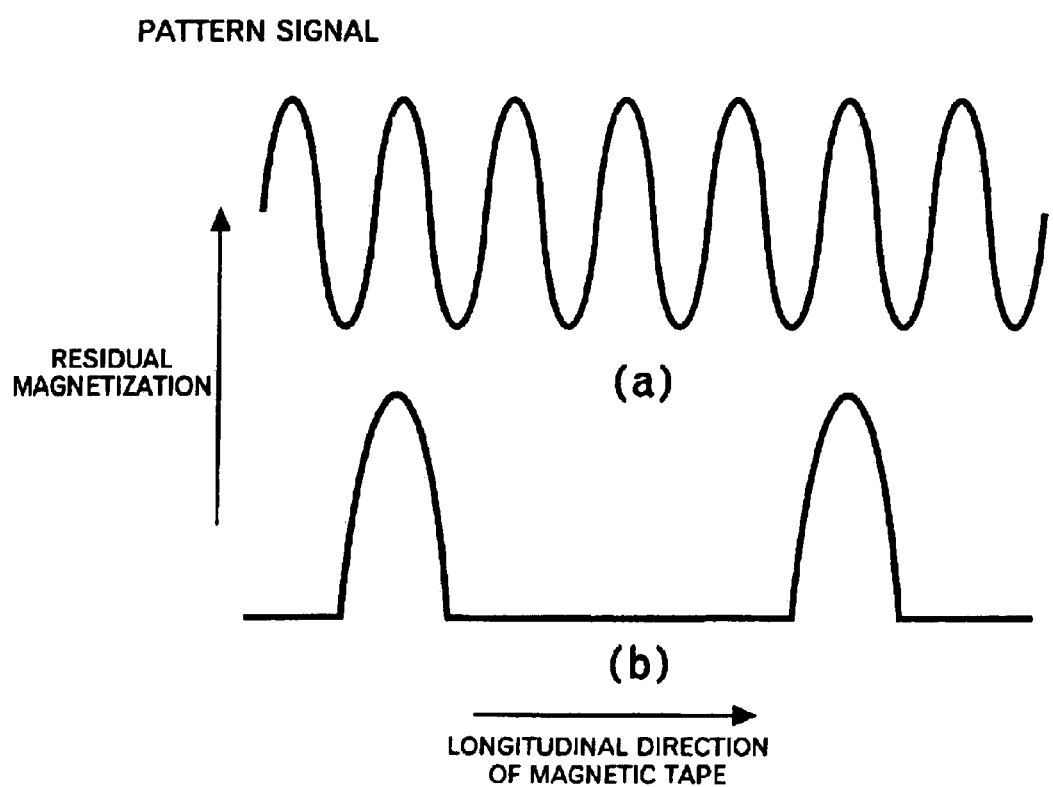
FIG. 5 is a view showing embodiments of pattern signals used for the cleaning tape of the invention.

FIG. 5 is a view showing embodiments of the pattern signals applicable in the invention, using the longitudinal direction of the tape as the abscissa and the residual magnetization maintained in the pattern signal as the ordinate. A waveform (a) of FIG. 5 represents a pattern signal, so-called "1T", and a waveform (b) of FIG. 5 represents a pattern signal, so-called "4T". In the invention, a magnetic tape in which is formed a patter signal like either of the pattern signals shown in FIG. 5 is used for cleaning. It is thus possible to measure the characteristics of the magnetic head that has been just cleaned, immediately after the adjustment-operation is performed. Cleaning is generally performed periodically, and therefore, by storing the measured peak value together with time information, such as the number of cleanings, the drive operation time, and the date, it is possible to check a failure of the magnetic head and to predict a failure in the near future.

Figure 6:
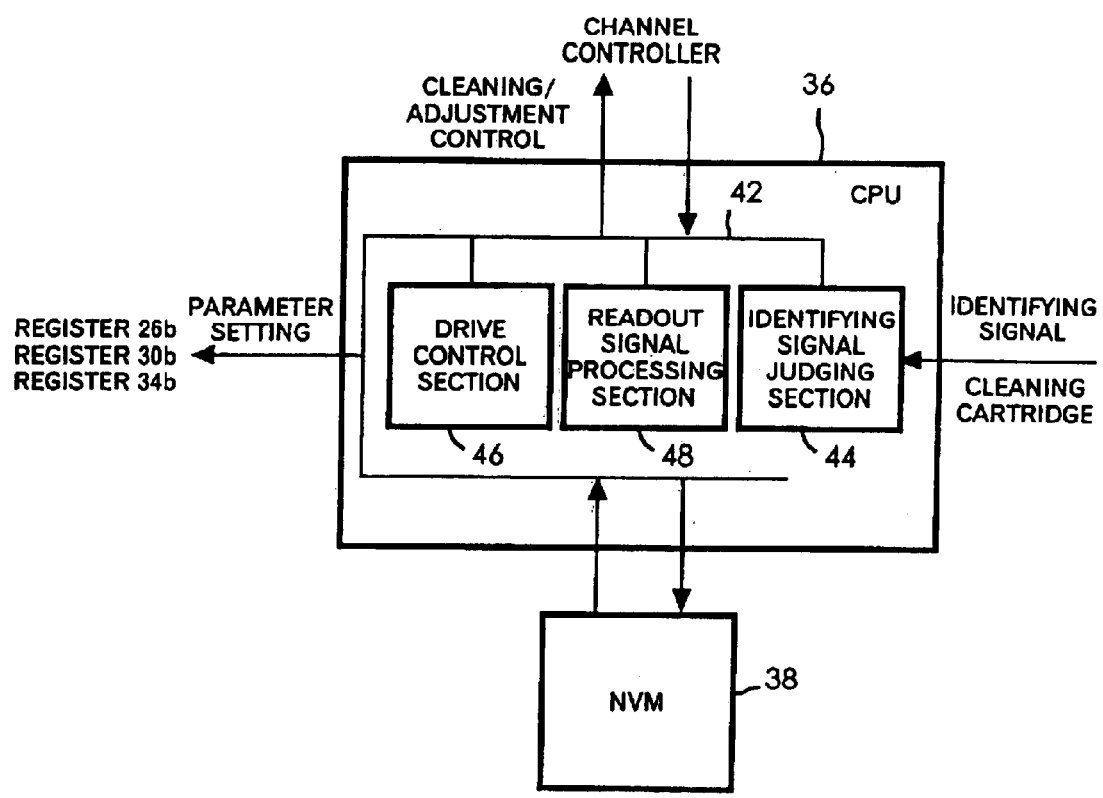
FIG. 6 is a schematic view showing an arrangement of a central processing unit (CPU) installed in a drive unit of the invention.

FIG. 6 is a view showing an input and an output between the CPU 36 and the peripheral circuits or the peripheral device in the invention. As shown in FIG. 6, the CPU 36 first receives a cleaning identifying signal supplied in the form of the cleaning bit from the non-volatile memory 18 in the cleaning cartridge at an identifying signal judging section 44, and judges to perform an operation in a cleaning mode. Then, the CPU 36 runs a program for performing the cleaning operation, and directs a drive control section 46 connected to an internal bus 42 to control driving means, such as a motor. A desired magnetic tape operation is thus performed. Further, for the purpose of adjustment, the CPU 36 writes a specific pattern maintained in the non-volatile memory 38 to be used for adjustment and reads out the written pattern, then processes the read signal in a read signal processing section 48, and makes a judgment on the obtained information as to the specific pattern or the like.

When it is judged to perform the cleaning operation, parameter-setting values are sent to the register 26b, the register 30b, and the register 34b from the non-volatile memory 38 via the internal bus 42, and these parameter-setting values are used for adjustments to the write amplifier 26a, the read amplifier 30a, and the channel filter 34a. Further, the CPU 36 drives the driving means to run the magnetic tape until a pattern-signal-recorded segment reaches a position adjacent to the read head 24b. The pattern signal is thereby read out through the use of the adjusted parameters, and the aforementioned check and prediction of deterioration of the magnetic head are thus made possible.

Figure 7:
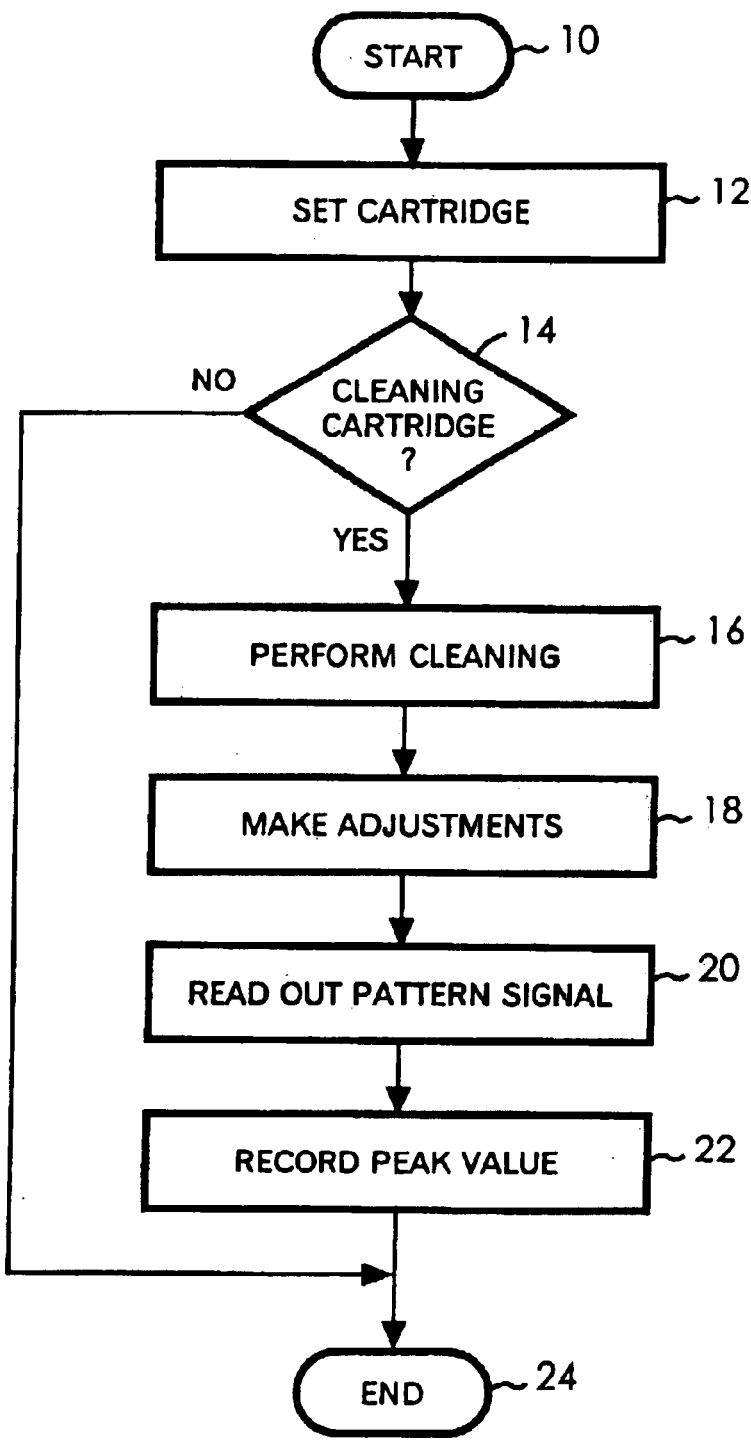
FIG. 7 is a flowchart showing a process of a magnetic head adjusting method of the invention.

FIG. 7 is a flowchart showing a process of the magnetic head adjusting method of the invention. The adjusting method of the invention shown in FIG. 7 begins with Step 10, and in Step 12, a cleaning cartridge is set in the drive unit. Then, in Step 14, whether the set cartridge is the cleaning cartridge is judged. In this particular embodiment of the invention, this judgment is made by checking whether a certain bit maintained in the non-volatile memory 18 installed in the cleaning cartridge is detected. When the certain bit is not found by the judgment in Step 14 (no), the cartridge needs to be replaced with a cleaning cartridge, and the flow branches and skips to Step 24 to end the process.

When the certain bit is found (yes), it means that the cleaning cartridge is set. Hence, according to the method of the invention, the drive unit runs the cleaning tape (magnetic tape) in the cleaning cartridge until a segment DC1 reaches the position of the magnetic head, and runs the cleaning tape back and forth within the segment DC1. The cleaning is thereby performed. When the cleaning ends, the flow proceeds to Step 18, where the drive unit runs the cleaning tape until the segment DT1 reaches the position of the magnetic head. Then, adjustments are made through writing and reading of the specific pattern used for adjustment through the use of the segment DT1. The aforementioned specific pattern applicable in the invention is not especially limited, .and any pattern can be used as long as the pattern can be distinguished clearly from the noise level and the adjusting parameters can be set adequately.

Then, in the adjusting method of the invention, in Step 20, the drive unit is driven to run the cleaning tape until the pattern-signal-recorded segment reaches the position adjacent to the magnetic head, and the pattern signal (tone pattern) is thereby read out. In subsequent Step 22, the read peak value together with the time information, such as the number of cleanings, is recorded into the non-volatile memory installed in the drive unit, for example. Then, the adjusting method of the invention ends in Step 24.

Figure 8:
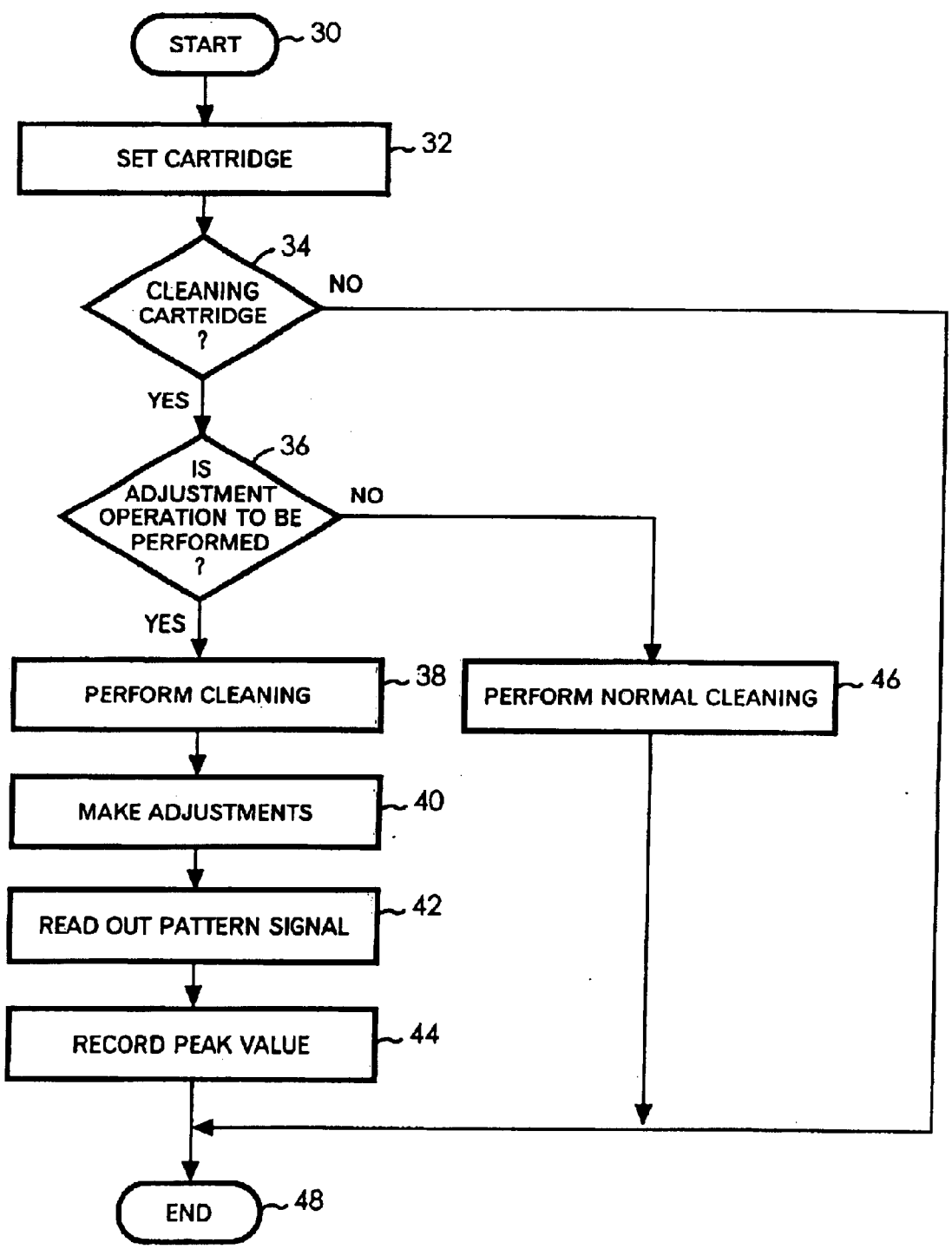
FIG. 8 is a flowchart showing a process of another embodiment of the magnetic head adjusting method of the invention.

FIG. 8 is a view detailing a second embodiment of the adjusting method of the invention. In the adjusting method of the second embodiment of the invention, the cleaning and adjustment mode of the invention is distinguished from the normal cleaning mode, and hence, operations specific to the cleaning cartridge are made possible. The second embodiment of the adjusting method of the invention shown in FIG. 8 begins with Step 30, and a cartridge is set in Step 32. Then, in Step 34, the non-volatile memory 18 attached to the cartridge is checked to judge whether the cleaning bit is set therein.

When the cleaning bit is set therein (yes), whether the adjustment-operation is to be performed is judged further in Step 36. This judgment is made by, for example, setting an additional bit indicating to perform the adjustment-operation in the non-volatile memory attached to the cartridge, and when the additional bit is detected in addition to the cleaning bit, it is judged that the adjusting method of the invention is to be performed. Also, in still another embodiment of the invention, the pattern-signal-recorded segment of the cleaning tape of the invention may be checked first, and when the pattern signal is detected, it is judged that the adjustment-operation is to be performed. When it is judged that the adjustment-operation is to be performed in Step 36 (yes), Step 38 through Step 44 are performed in the same manner as explained with FIG. 7. Then, the adjusting method of the invention ends in Step 48.

When the bit indicating the adjustment-operation or the pattern signal is not detected in Step 36 (no), the flow proceeds to Step 46, where the normal cleaning operation alone is performed, after which the process ends in Step 48. In this case, for example, it is preferable that the drive unit registers time information related to the cleaning as the information in the form of a counter, so that a failure can be predicted through the adjustment-operation of the invention performed next time. Further, when detecting a cleaning cartridge to which the adjusting method of the invention is not applicable, such detection may be notified to the user to instruct the user to replace the cleaning cartridge. Also, when the cleaning bit is not detected and the cartridge is not identified as the cleaning cartridge by the judgment in Step 34, cleaning cannot be performed. Hence, the flow proceeds to Step B to end the process of the adjusting method of the invention.

Figure 9:
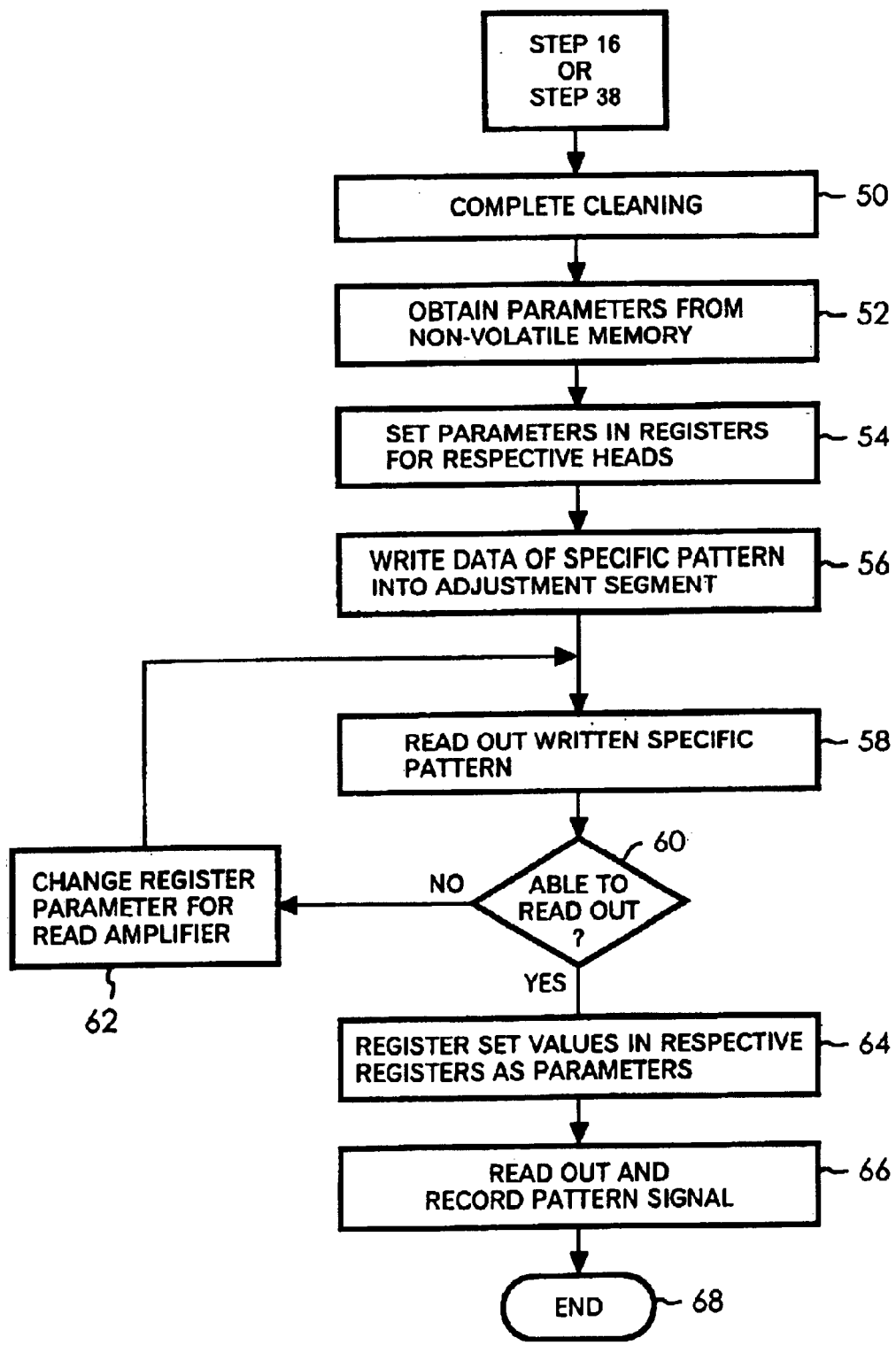
FIG. 9 is a flowchart showing a process of adjusting the magnetic head in the invention.

FIG. 9 is a flowchart showing a detailed process of adjusting the magnetic head in the invention. In the invention, the process of adjusting the magnetic head begins with Step 50 after the cleaning operation ends in Step 16 or Step 38 described with reference to FIG. 7 or FIG. 8, respectively. In Step 52, the adjusting parameters, such as the write parameter, the read parameter, and the channel filter parameter, used for the adjustments are sent respectively to the register 26b, the register 30b, and the register 34b from the non-volatile memory installed in the drive unit. Then, in Step 54, the parameters are set in their respective registers, and in Step 56, data of specific pattern is written into an adjustment segment, for example, the DT1 of FIG. 4, through the use of the parameters set in Step 56. In this case, in the invention, the registers may secure an area large enough to maintain more than one parameter, so that the respective heads or the channel filter makes the adjustments by selecting the parameter one by one. Also, the invention may adopt an arrangement such that the registers obtain the adjusting parameters by inquiring the non-volatile memory each time the necessity arises.

Further, in Step 58, the written specific pattern is read out, and in Step 60, whether the read head was able to read out the written specific pattern is judged. When it succeeded in reading, (yes), the parameter values the respective registers are using at this point are registered as the parameters to be used thereafter. When the read head failed in reading with a sufficient gain (no), the parameter in the register 30b for the read amplifier 30a is changed in Step 62, and Step 58 through Step 62 are repeated until yes is given to the judgment in Step 60.

In Step 60, the parameters are set based on whether the read head was able to read out the specific pattern. However, in the invention, each parameter can be adjusted adequately and set to give the maximum gain. Alternatively, the number of repetitions of Step 58 through Step 62 may be counted, and when the number of repetitions reaches or exceeds a predetermined number, the flow branches to Step 54 to change the values of the parameters again, so that the process from Step 58 through Step 62 is repeated until a positive result is given to the judgment in Step 60. Further, in the invention, time out may be set for repetitions of Step 54 through Step 62, so that a display informing the user of an abnormality is shown when the repetitions do not end after a predetermined time has passed.

In subsequent Step 66, the cleaning tape is run until the pattern-signal-recorded segment reaches the position of the read head, and the pattern signal is thereby read out. The peak value of the read pattern signal is recorded as the representing value. Then, the adjustment process ends in Step 68.

Figure 10:
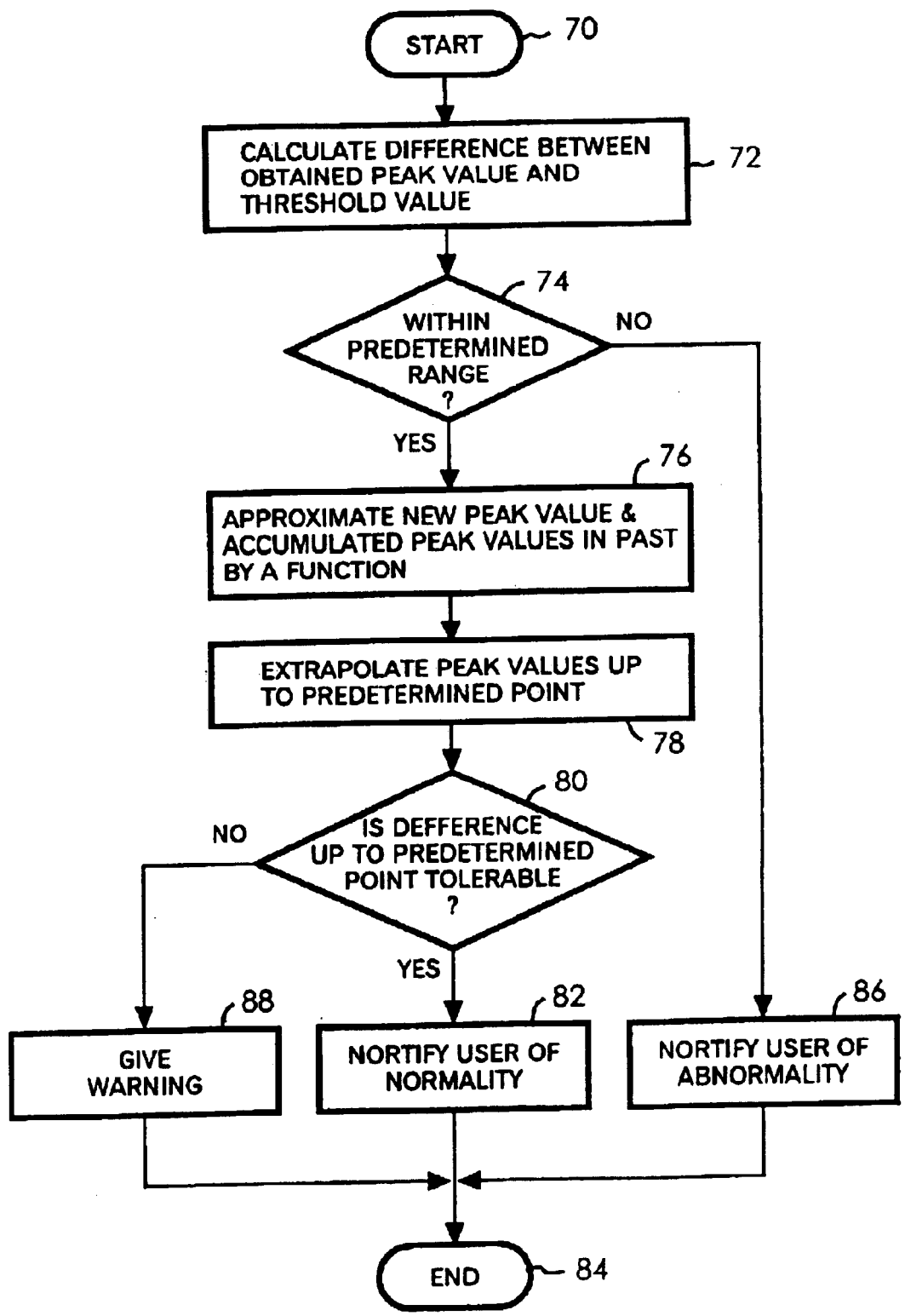
FIG. 10 is a flowchart showing a process of detecting and predicting an inconvenience of the magnetic head in the invention.

FIG. 10 is a flowchart showing a process of detecting or predicting a failure of the magnetic head in the invention. The process shown in FIG. 10 begins with Step 70, and in Step 72, a difference between the obtained peak value and the pre-set threshold value is calculated. The threshold value is set as a least possible signal strength value for adequately reading out written data, for example. In the process shown in FIG. 10, in subsequent Step 74, whether the calculated difference is within a predetermined range is judged, and when it is within the predetermined range (yes), the flow proceeds to Step 76, where a change of the peak value with time is approximated through a function, such as a quadratic function, from the new peak value and the accumulated time information.

In Step 78, the obtained function is extrapolated up to a predetermined point, for example, when the next cleaning is scheduled. The peak value in the next cleaning is thereby predicted. In Step 80, whether a difference between the predicted peak value and the threshold value is within the predetermined range is judged, and when it is within the predetermined range (yes), the flow proceeds to Step 82, where a display (notice of normality) is shown to inform the user that the predicted characteristics of the magnetic head are assured until the next cleaning, after which the detecting and predicting process for the magnetic head in the invention ends in Step 84.

When the difference value between the threshold value and the predicted value up to the predetermined point is outside of the predetermined range in Step 80 (no), the flow proceeds to Step 88, where a warning (notice of warning) is given to inform the user of the possibility that a failure will occur before the cleaning is performed next time, after which the process ends in Step 84. In the process shown in FIG. 10, when the calculated value is outside of the predetermined range already in Step 74 (no), an inconvenience has already occurred in the magnetic head for some reason. Hence, an abnormality is notified (notice of abnormality) to the user in Step 86, and the process ends in Step 84.

As has been described, the result of the detecting or predicting process in the invention is fed back to the user to inform the user that:

(1) an inconvenience has already occurred in the magnetic head or in the drive unit, and no further use is recommended (abnormality);

(2) the magnetic head is operating normally at the present moment, but there is a probability that an abnormality will occur in the drive in the near future (warning); and (3) the magnetic head is operating normally at the present moment and it is unlikely that a magnetic head-induced inconvenience will occur in the foreseeable future (normality).

The user or the service engineer is thus able to understand the exact conditions of the magnetic head.

In the invention, these conditions of the magnetic head are displayed, for example, through the indicator composed of an LED or an LCD provided to the front panel of the drive unit as described above, by illuminating in red (abnormality), yellow (warning), and green (normality) depending on the degree of a trouble. Also, the invention may be arranged in such a manner that, once an abnormality is notified, the computer system connected to the magnetic recording system or the magnetic recording system returns an error to the user in response to a command to use a cartridge. Further, in the invention, the abnormality status may be returned to a command to refer to logs of the drive, so that the user is able to conduct an analysis. Because these logs are saved in the nonvolatile memory, it is possible to notify the user or the service person of an abnormality whether the power of the drive unit is turned ON or OFF.

Figure 11:
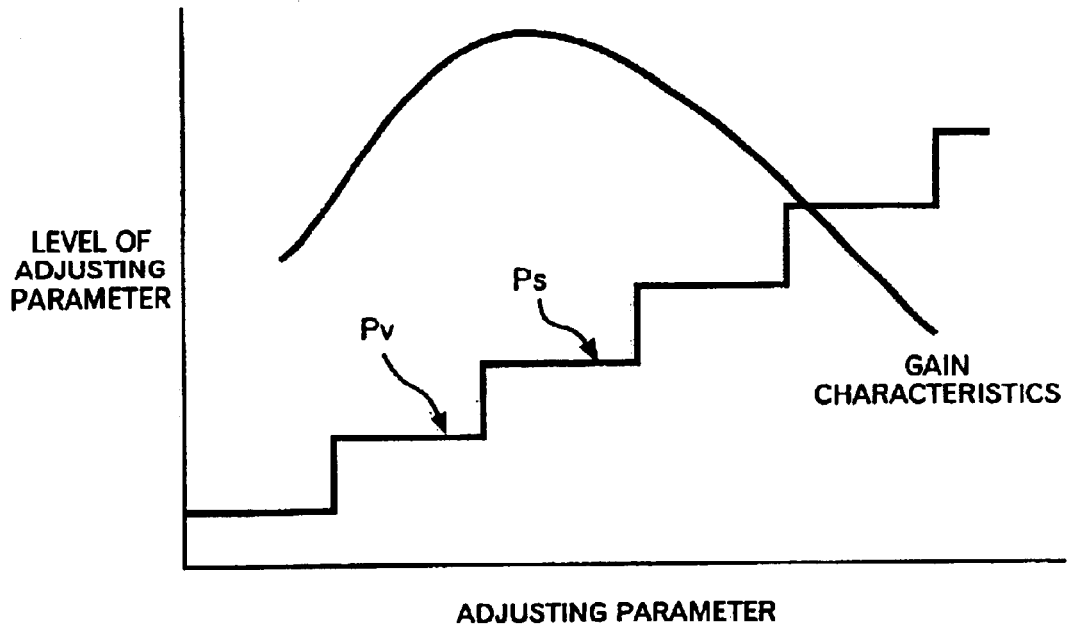
FIG. 11 is a schematic view showing one embodiment for changing an adjusting parameter of the invention.

FIG. 11 is a view schematically showing a process of setting a parameter in the adjustment-operation of the invention. FIG. 11 is a view using the adjusting steps (the number of steps) of the adjusting parameter as the abscissa and the level of the adjusting parameter as the ordinate. At the same time, FIG. 11 schematically shows variance in the gain characteristics in association with a change in the level of the adjusting parameter. In the embodiment shown in FIG. 11, the adjusting parameter is maintained as a stepwise discrete value in the non-volatile memory installed in the drive unit. In this particular embodiment shown in FIG. 11, Pv is given as the value of a specific adjusting parameter before the adjustment.

In the embodiment shown in FIG. 11, the level of the adjusting parameter is raised to achieve satisfactory reading during the adjustment-operation following the cleaning operation, and Ps is given as the parameter after the adjustment in FIG. 11. At the same time, FIG. 11 shows the gain characteristics after the adjustment, and it reveals that the gain is maximized when Ps is given as the adjusting parameter. However, in the invention, the adjusting parameter does not have to be set to maximize the gain characteristics as described above. It is preferable to set the adjusting parameter based on whether the read head is able to read out the specific pattern when consideration is given to the time needed for the cleaning and adjustment.

Figure 12:
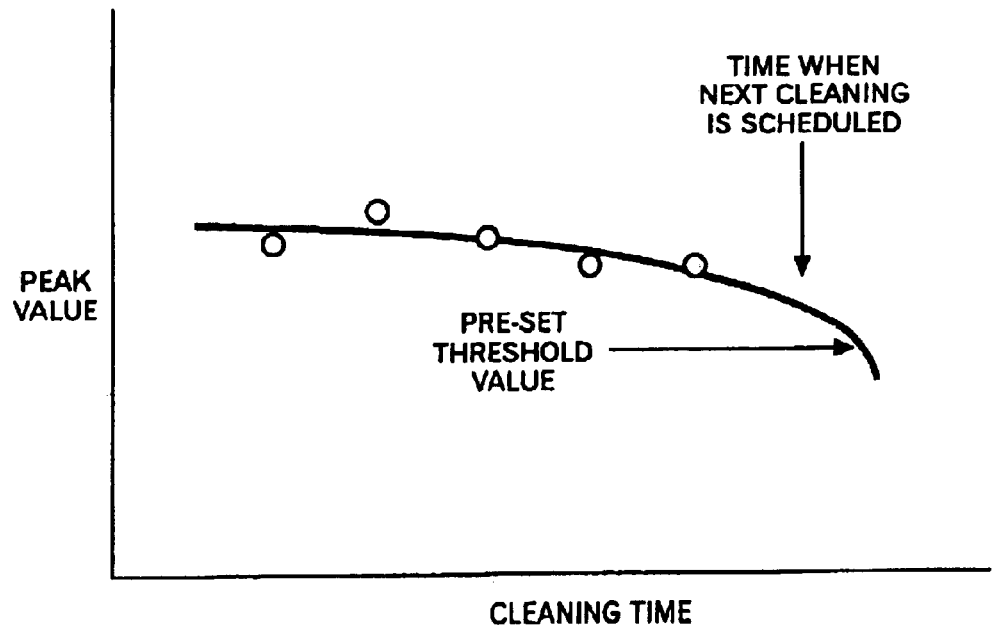
FIG. 12 is a schematic view showing a process of predicting an inconvenience of the magnetic head in the invention.

FIG. 12 is a view schematically showing a plot obtained through the process from Step 76 through Step 80 of FIG. 10 to predict an inconvenience of the magnetic head in the invention. In the invention, the peak value of the pattern signal measured in each cleaning is maintained in the non-volatile memory in the drive unit together with the time information. The plot of FIG. 12 can be thus obtained from the stored peak values and time information and the newly obtained peak value and the time information. This plot is approximated through a quadratic function, for example, and extrapolated by a suitable extrapolation method. Then, when a difference between the pre-set threshold value and the value predicted through extrapolation is within a predetermined range, it is—judged that deterioration that would occur until the next cleaning is tolerable, and normality is displayed to the user or the service engineer.

Figure 13:
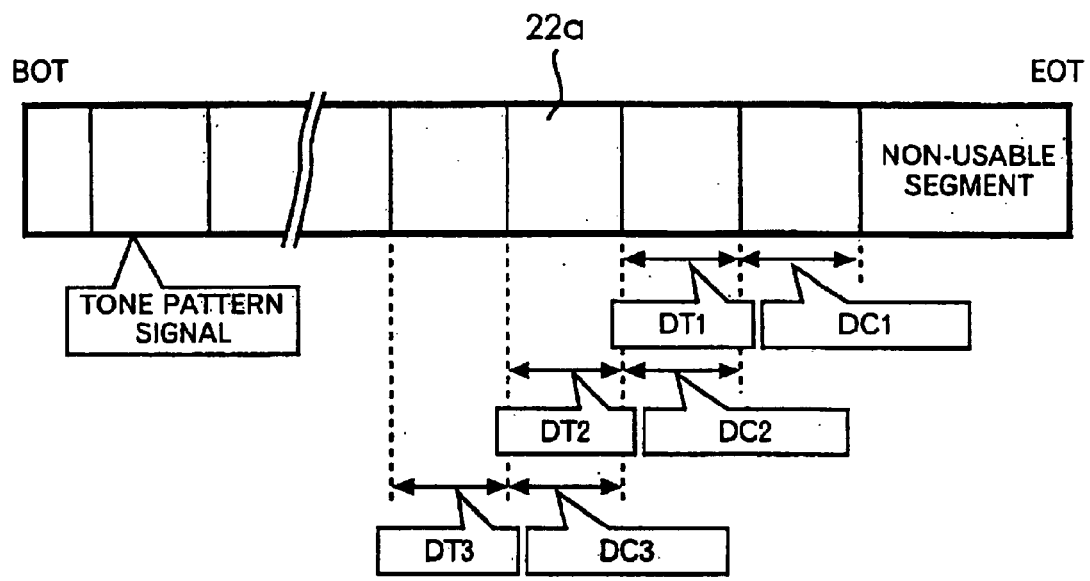
FIG. 13 is a view showing the process of adjusting the magnetic head in the invention in a relation with segments of the cleaning tape.
Figure 14:
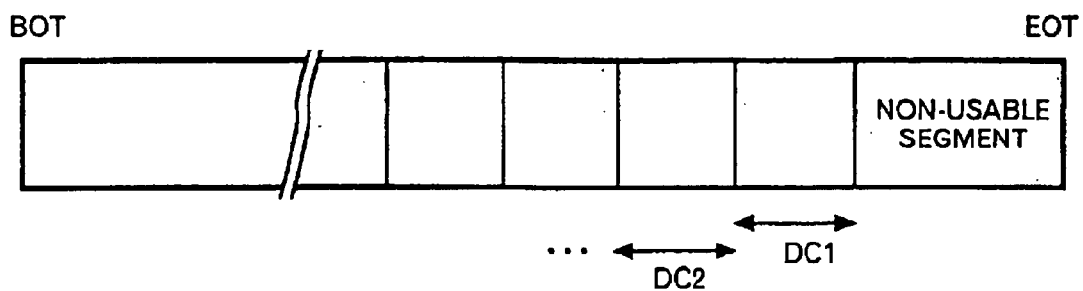
FIG. 14 is a view showing an arrangement of a conventional cleaning tape.

FIG. 13 is a view showing in detail the magnetic tape-running control by the adjusting method of the invention. According to the running control employed in the invention, the magnetic tape is run up to a segment DC1 first, and the magnetic tape is moved back and forth with the magnetic head positioned on the segment DC1. The cleaning operation is thereby performed. When the cleaning operation ends, the adjustment-operation for the magnetic head is performed through writing and reading of the specific pattern through the use of an unused adjacent segment DTI. To be more specific, this adjustment-operation is performed by setting the respective parameters used in the peripheral circuits, such as the write amplifier, the read amplifier, and the channel filter, through the aforementioned process. Also, in this particular embodiment of the invention, as shown in FIG. 13, the segment DT1 used in performing the adjustment-operation, for example, is hardly contaminated different from the segment used in the cleaning operation. Hence, it is used as a cleaning segment DC2 in the cleaning operation performed next time.

However, in the invention, when the length of the cleaning tape is not especially limited, totally unused segments can be used as the cleaning segments DCn or the adjusting segments DTn. Also, under the magnetic tape-running control in the invention, when one cycle of the cleaning and adjustment ends, the magnetic tape 22a is run until the pattern-signal-recorded segment reaches the position of the magnetic head, and the pattern signal is thereby read out by the magnetic head to which the adjustment have been just made. The peak strength of the pattern signal read out by the magnetic head that has been just cleaned reflects the exact deterioration with time of the magnetic head. Thus, by using the pattern signal like either of the pattern signals shown in FIG. 5, it is possible to check or predict a failure of the drive unit through the use of the peak strength.

As has been described above, according to the invention, it is possible to provide a cleaning cartridge, drive unit, a method of adjusting a magnetic head, and a magnetic recording system, each capable of making adjustments to the magnetic head when cleaning is performed, and further, capable of checking and predicting a failure of the magnetic head. Also, according to the invention, adjustments of the parameters that have been made in the factory at the manufacture's end can be readily achieved on-site. Further, according to the invention, by performing the adjustment-operation through the use of the cleaning tape, it is possible to adjust parameters at the timing of the cleaning repeated periodically, and the reliability of the magnetic recording system can be thus enhanced further.

The above description described the invention by way of particular embodiments illustrated in the accompanying drawings. It should be appreciated, however, that the invention is not limited to the embodiments illustrated in the accompanying drawings, and any known arrangement is applicable as long as the advantages of the invention can be achieved.

What is claimed is:

1. A drive unit comprising:

means for identifying a cartridge inserted into said drive unit as a cleaning cartridge; and means for causing said drive unit to perform an adjustment-operation for a magnetic head utilizing the cleaning cartridge in response to an identification of the cleaning cartridge wherein said means for causing said drive unit to perform an adjustment-operation causes said drive unit to both write a specific pattern signal in a first predetermined segment of a magnetic tape held in the cleaning cartridge, and read out said specific pattern signal from said first predetermined segment of said magnetic tape;

means for recording the specific pattern signal together with time information.

2. The drive unit according to claim 1, further comprising:

means for causing said drive unit to perform a cleaning operation for the magnetic head; and means for reading out a pattern signal from a second predetermined segment of the magnetic tape, wherein said identifying means comprises means for checking a certain bit in a non-volatile memory installed in the cleaning cartridge.

3. The drive unit according to claim 2, wherein said means for causing said drive unit to perform an adjustment-operation causes said drive unit to perform the cleaning operation utilizing a third predetermined segment of the magnetic tape, and perform the adjustment-operation in response to the cleaning operation.

4. The drive unit according to claim 2, further comprising means for recording said pattern signal together with time information.

5. The drive unit according to claim 1, wherein said means for causing said drive unit to perform an adjustment-operation further causes said drive unit to change a parameter in a peripheral circuit of the magnetic head based upon reading out said specific pattern signal.

6. The drive unit according to claim 1, further comprising means for giving a notice about deterioration of the magnetic head revealed by the adjustment-operation.

7. A method of adjusting a magnetic head comprising:

Identifying a cartridge inserted into a drive unit as a cleaning cartridge; and performing an adjustment-operation for the magnetic head utilizing the cleaning cartridge in response to said identifying wherein said performing an adjustment-operation comprises writing a specific pattern signal in a first predetermined segment of a magnetic tape held in the cleaning cartridge, and reading out said specific pattern signal from said first predetermined segment of said magnetic tape; and recording the specific pattern signal together with time information.

8. The method according to claim 7, further comprising:

performing a cleaning operation for the magnetic head; and reading out a pattern signal from a second predetermined segment of a magnetic tape held in the cleaning cartridge, wherein said identifying comprises checking a certain bit in a non-volatile memory installed in the cleaning cartridge.

9. The method according to claim 8, wherein performing said adjustment-operation comprises performing the cleaning operation utilizing a third predetermined segment of the magnetic tape, and performing the adjustment-operation in response to the cleaning operation.

10. The method according to claim 8, further comprising recording said pattern signal together with time information.

11. The method according to claim 7, wherein performing the adjustment-operation comprises:

changing a parameter in a peripheral circuit of the magnetic head based upon reading out said specific pattern signal.

12. The method according to claim 7, further comprising giving a notice about deterioration of the magnetic head revealed by the adjustment-operation.

13. A magnetic recording system, comprising:

a cartridge comprising means for identifying the cartridge as a cleaning cartridge, a magnetic tape including a cleaning portion and an adjustment portion each between a front end to a rear end thereof, and a magnetically readable pattern signal wherein each of said means for identifying the cartridge, said magnetic tape, and said magnetically readable pattern signal are disposed within a casing; and a drive unit comprising a magnetic head;

means for identifying the cleaning cartridge;

means for causing said drive unit to perform an adjustment-operation for the magnetic head utilizing the cleaning cartridge in response to an identification of the cleaning cartridge wherein said means for causing said drive unit to perform an adjustment-operation causes said drive unit to write a specific pattern signal in a predetermined segment of a magnetic tape held in the cleaning cartridge, and read out said specific pattern signal from said predetermined segment of said magnetic tape;

means for reading out a pattern signal from a predetermined segment of the magnetic tape held in the cleaning cartridge; and means for recording the pattern signal together with time information.

14. The magnetic recording system according to claim 13, wherein said cartridge is in conformity with LTO standards.

15. The magnetic recording system according to claim 13, wherein said drive unit further comprises:

means for performing a cleaning operation for the magnetic head; and means for giving a notice about deterioration of the magnetic head revealed by the adjustment-operation.

* * * * *